Jan. 2, 1962

T. H. HORMANN 3,015,742

PULSE AMPLIFIER UTILIZING TWO MAGNETIC
CORES CONNECTED IN SERIES

Filed July 13, 1959

INVENTOR

THEODOOR HANS HORMANN

BY

Frank R. Jufani

AGENT

United States Patent Office 3,015,742
Patented Jan. 2, 1962

3,015,742

PULSE AMPLIFIER UTILIZING TWO MAGNETIC CORES CONNECTED IN SERIES

Theodoor Hans Hormann, Hilversum, Netherlands, assignor to North American Philips Company, Inc., New York, N.Y., a corporation of Delaware Filed July 13, 1959, Ser. No. 826,524
Claims priority, application Netherlands Aug. 22, 1958
4 Claims. (Cl. 307—88.5)

The present invention relates to pulse amplifiers comprising a cocking terminal, a triggering terminal and an output terminal, which pulse amplifier delivers a substantially square pulse of a given amplitude and duration after applying a current pulse of given polarity and adequate value and duration to the cocking terminal (cocking the pulse amplifier) and subsequently applying a pulse of a given polarity and adequate value to the triggering terminal (triggering the pulse amplifier), which pulse amplifier comprises a core of square-loop magnetic material and a transistor, while the core carries a cocking winding connected to the cocking terminal, a control winding connected to an electrode of the transistor, an output winding connected to another electrode of the transistor and a trigger winding connected to the triggering terminal, one and the other such that after the pulse amplifier has been cocked and the core has thus been set to a given magnetic state and subsequently a pulse driving the core to the other magnetic state is applied to the triggering terminal, the initially closed transistor is opened by the voltage induced in the control winding, and the resulting current through the output winding subsequently drives the core completely to the other magnetic state. Besides having an amplifying and pulse-producing function such a pulse amplifier has a memory effect and is therefore suitable for use in logical circuit arrangements in which, however, a triggered pulse amplifier should never be able to deliver an output pulse unless having been recocked previously. Conventional pulse amplifiers of the aforesaid type do not always fulfil these conditions for the reason set out hereinafter. According to the invention, this limitation is mitigated by providing the pulse amplifier with a second core carrying a reset winding, a secondary control winding connected in series-combination with the control winding and a secondary output winding serially connected to the output winding, the whole being proportioned so that the second core, when triggering the pulse amplifier, begins to flip over only after the first core has been fully flipped over.

Figure 1:
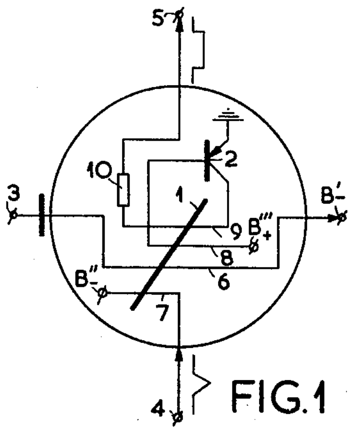
Figure 4:
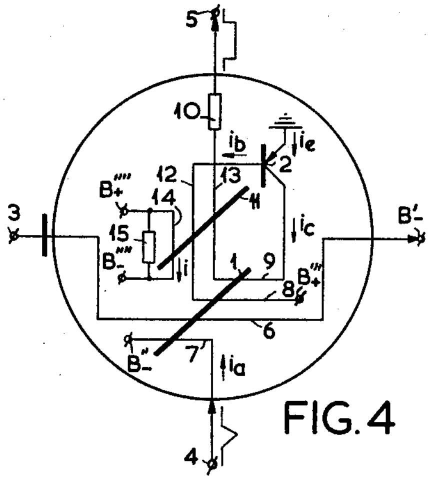
Figure 2:
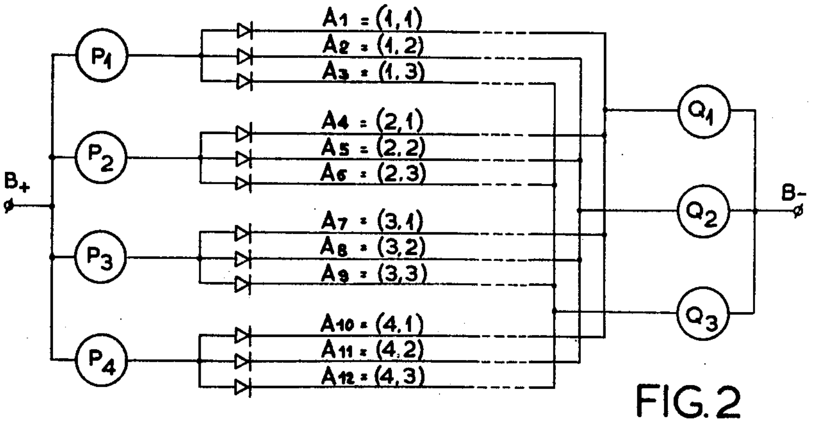
Figure 3:
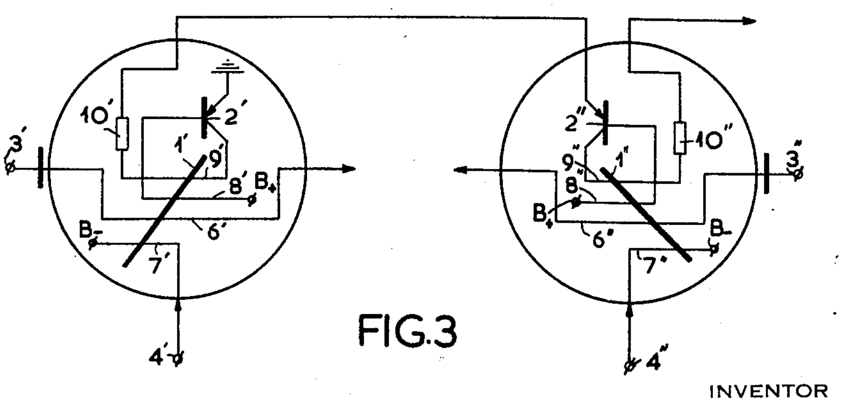

In order that the invention may be readily carried into effect, an example will now be described with reference to the accompanying drawings, in which FIG. 1 shows a diagram of a conventional pulse amplifier, FIG. 2 shows a diagram of a circuit arrangement using the pulse amplifier shown in FIG. 1, FIG. 3 shows in detail how the pulse amplifiers are connected in the circuit arrangement shown in FIG. 2, and FIG. 4 shows a diagram of a pulse amplifier according to the invention.

In FIG. 1, the ring-shaped core of square-loop magnetic material is designated by 1, the transistor of p-n-p type by 2, the cocking terminal by 3, the triggering terminal by 4, the output terminal by 5, the cocking winding by 6, the triggering winding by 7, the control winding by 8 and the output winding by 9. One end of the cocking winding 6 is connected to the cocking terminal 3 and the other end to a source B′ of negative potential. The triggering winding 7 is connected at one end to the triggering terminal 4 and at its other end to a source $B_-''$ of negative potential. The control winding 8 is connected at one end to the base of the transistor 2 and at the other end to a source $B_+'''$ of positive potential. The output winding is connected at one end, through a resistor 10, to the output terminal 5, and at its other end to the collector of the transistor 2. The emitter of the transistor 2 is connected to earth. In this figure, for simplification, the several windings are each time represented as a single conductor extending through the ring-shaped core 1, but actually they usually consist of a greater or lesser number of turns on the core 1. The several windings have winding senses as indicated in the drawing.

The circuit arrangement operates as follows: When a current pulse of sufficient strength is applied to the cocking terminal 3, the core 1 is set to a given magnetic state, in the present case state 1. This pulse, hereinafter termed cocking pulse, is assumed to have a sense towards the cocking terminal. The cocking pulse should be of sufficient duration to flip over the core 1 completely from the state 0 to the state 1. Subsequently a pulse, which may be very short, is applied to the triggering terminal 4, which pulse drives the core 1 to the state 0. This pulse, hereinafter termed triggering pulse, should be sufficiently strong for causing the onset of triggering of the core 1 to induce on the control winding a voltage which overcomes the positive bias of the base of the transistor 2 delivered by the positive supply $B_+'''$ and consequently renders the transistor conductive. As a result, however, a current passes through the output winding 9 and drives the core 1 likewise to the state 0. Consequently, if the triggering pulse has terminated prior to the core 1 reaching the state 0, the core 1 is fully set to the state 0 by the current through the output winding 9 delivered by the transistor 2.

It will be evident that, if desired, two or more than two pulses amplifiers may be cocked in series. However, a pulse amplifier once triggered shall not deliver a fresh pulse unless having been recocked.

FIG. 2 shows a circuit arrangement using gates of the aforesaid type in the manner shown in detail in FIG. 3. The circuit arrangement shown in FIG. 2 has for its object to send a pulse through any one of twelve wires $A_i$ ($i$=1, 2 . . . 12). For this purpose the twelve wires are indicated by ordered groups of two numbers ($p$, $q$) where $p$ traverses the values 1, 2, 3, 4 and $q$ traverses the values 1, 2, 3. The wires ($p$, 1), ($p$, 2), ($p$, 3) are connected at the left to a gate $P_p$ ($p$=1, 2, 3, 4), while the wires (1, $q$), (2, $q$), (3, $q$), (4, $q$) at the right are connected to a gate $Q_q$ ($q$=1, 2, 3). Each wire ($p$, $q$) comprises a diode having a pass-direction from the gate $P_p$ to the gate $Q_q$. If, for example, a current pulse is to be passed through the wire $A_7$=(3, 1), the gates $P_3$ and $Q_1$ have to be opened for a short time. When using the aforesaid pulse-amplifiers as gates they should be connected in such manner that their transistors are connected in series, as shown in FIG. 3. In order to pass a pulse through the wire $A_7$=(3, 1), the pulse amplifiers $P_3$ and $Q_1$ are first cocked and subsequently pulses are applied to the triggering terminals of all the gates. Since, however, only the gates $P_3$ and $Q_1$ have been cocked, only the transistors of said gates are momentarily and a current pulse passes only through the wire $A_7$=(3, 1). The diodes in the wires $A_i$ serve to prevent parallel current paths.

However, this circuit arrangement has an unexpected limitation. As a matter of fact, not all the gates are like fast due to the necessary tolerances of the cores and transistors of the Gates $P_i$ and $Q_j$. Assume, for example, that the gate $Q_1$ is considerably faster than the gate $P_3$. If these gates are triggered simultaneously the transistor of the gate $Q_1$ will then be closed before the core of the gate $P_3$ has fully flipped over and thus has reached the state 0. Since the circuit in the output winding of the gate $P_3$ is, however, interrupted in the gate $Q_1$ from said instant onwards, the core of the gate $P_3$ does not reach completely the state 0 and thus remains in a state different from the state 0. As a consequence of this the gate $P_3$, without having been recocked, can once more be triggered so as to allow a current pulse to pass through an undesired wire. Thus, the circuit arrangement operates satisfactorily only when all the pulse amplifiers are substantially like fast. This, however, imposes stringent requirements on the tolerances of the cores and the transistors, which cannot be met by normal mass-products so that the cores and the transistors have to be specially selected. This, of course, is a serious disadvantage. It can be avoided by coupling the wires $A_1$ through a transformer and a second transistor to the output terminals of the gates $P_1$ and $Q_j$ as set out in U.S. Patent 2,968,029, but this involves a non-negligible additional complication.

FIG. 4 illustrates how this disadvantage can be avoided according to the invention. The difference from the pulse amplifier shown in FIG. 1 consists in that provision is made of a second ring-shaped core 11 of square-loop magnetic material, which core carries a secondary control winding 12 connected in series with the control winding 8, a secondary output winding 13 connected in series with the output winding 9 and a reset winding 14. The ends of the reset winding are connected to the terminals of a source of direct voltage B'''' in such manner that the second core is set to the state 1. The reset winding 14 is preferably short-circuited, for example, by a resistor 15, thus preventing the base of the transistor 2 from attaining an unduly high positive bias during the reset. Although in a less simple manner, this result is also obtainable by means of a clipping circuit.

It may consequently be said that the core 1 of the conventional pulse amplifier is divided into two cores 1 and 11, the cocking winding 6 and the trigger winding 7 being provided only on the core 1. This means, however, that the second core 11 does not participate in the memory function of the pulse amplifier. Hereinafter it will be shown that, when triggering the pulse amplifier, the second core 11 does not tend to flip over before the core 1 has fully reached the state 0. If so, the aforesaid limitation occurs only after the second core of one of the two pertinent pulse amplifiers has been fully flipped over to the state 0, and thus the corresponding transistor is closed, before the core 1 of the other pulse amplifier has been fully driven to the state 0. Thus the whole should be such that the slowest core 1 is faster than the fastest combination of the two cores 1 and 11. This, however imposes so much less stringent requirements to the tolerances so that they can be met by normal mass-products.

In order to show that, in effect, the core 11 does not tend to flip over before the core 1 has been fully flipped over, the triggering of the pulse amplifier will be divided into three stages, to wit (1) The stage in which the triggering pulse is present,
(2) The stage in which the triggering pulse is terminated, but the core 1 has not reached the state 0,
(3) The stage in which the core 1 has reached the state 0 and the core 11 is flipping over.

Let $N_1$ represent the number of ampere turns required for initiating the flipping over of the core 1 (i.e. bring into the steep part of its magnetization curve), $N_2$ the number of ampere turns required for flipping over the core 11, $i_a$ the current strength of the triggering pulse, $i_p$ the value of the base current of the transistor 2 (positive from the base onwards), $i_c$ the current strength of the collector-current of the transistor (positive from the collector onwards), $i$ the current strength of the reset current, $n_a$ the number of turns of the triggering winding 7, $n_{b1}$ the number of turns of the primary control winding 8, $n_{b2}$ the number of turns of the secondary control winding 12, $n_{c1}$ the number of turns of the primary output winding 9, $n_{c2}$ the number of turns of the secondary output winding 13 and $n$ the number of turns of the reset winding 14. During the first stage, the following equations hold:

$$\text{Core 1: } n_a i'_a + n_{c1} i'_c - n_{b1} i'_b = N_1$$
$$\text{Core 11: } n_{c2} i'_c - n_{b2} i'_b - ni < 0$$

During the first stage, the core 11 is consequently driven to the state 1 already occupied by it, and does not flip over.

During the second phase, the following equations hold:

$$\text{Core 1: } n_{c1} i''_c - n_{b1} i'_b = N_1$$
$$\text{Core 11: } n_{c2} i''_c - n_{b2} i''_b - ni < 0$$

During this phase, the core 1 consequently continues to flip over, but the core 11 remains in the state 1.

When the core 1 reaches the state 0 the base-current $i_b$ drops so that $$n_{c2} i'''_c - n_{b2} i''_b - ni = N_2$$

due to which the core 11 begins to flip over. However, when this core reaches the state 0 the negative voltage at the base of the transistor 2 disappears and the latter closes so that $i_c$ and $i_b$ both become zero. The core 11 is then reset to the state 1 by the reset current.

During all the stages, the transistor is over-driven so that $i'_c = i''_c = i'''_c$.

If the circuit of the output windings 9 and 13 is interrupted prior to the core 11 reaching the state 0, then $i_c$ becomes 0 so that the core 11 is not further driven to the state 0. As a result the negative voltage at the base of the transistor 2 disappears so that the latter is closed and the core 11 is reset to the state 1 by the reset current $i$. In any case, however, the core 1 has been fully flipped over so that this does not disturb the memory function of the pulse amplifier.

The pulse amplifier according to the invention can be triggered by means of a very short pulse and delivers a substantially square output pulse having steep front and trailing edges. It is not necessary to use a particular filter for shaping the edges. It is only necessary for the triggering pulse to have an amplitude sufficient for driving the core 1 to the steep part of its magnetization curve so that the voltage induced on the control winding 8 is sufficient for opening the transistor. As soon as the latter has been opened, however, it remains open, since the collector current subsequently takes over the function of the triggering pulse.

What is claimed is:

1. A pulse amplifier comprising first and second magnetic cores of square loop material, said first core having a cocking winding, a first control winding, a first output winding, and a triggering winding, said second core having a reset winding, a second control winding, and a second output winding, amplifying means having input and output circuits, means connecting said cocking winding to a source of cocking signals, means connecting said triggering winding to a source of triggering signals, said first and second control windings being serially connected to said input circuit of said amplifying means, said first and second output windings being serially connected in said output circuit of said amplifying means, and said reset winding being connected to a source of direct voltage.

2. The pulse amplifier of claim 1, in which said amplifying means comprises a transistor.

3. A pulse amplifier comprising a first magnetic core of square loop material having first and second magnetic states, said first core having a cocking winding, a triggering winding, a first control winding, and a first output winding, amplifying means having an input circuit and an output circuit, means for applying a first signal to said cocking winding to drive said first core to said first magnetic state, means for applying a second signal to said triggering winding tending to drive said first core to said second magnetic state, a second magnetic core having first and second magnetic states, said second core having a reset winding, a second control winding, and a second output winding, means serially connecting said first and second control windings in the input circuit of said amplifying means, means serially connecting said first and second output windings in the output circuit of said amplifying means, and means connecting said reset winding to a source of direct voltage tending to hold said second magnetic core in said first magnetic state, said windings being connected so that said current in said output windings tends to drive said first and second magnetic cores into said second magnetic states, the windings of said cores being proportioned so that said second magnetic core cannot be driven into said second magnetic state until said first magnetic core has been driven into said second magnetic state.

4. The pulse amplifier of claim 3, in which said amplifying means comprises a transistor.

References Cited in the file of this patent

UNITED STATES PATENTS

| | | |
|---|---|---|
| 2,881,331 | Alexander | Apr. 7, 1959 |
| 2,902,609 | Ostroff | Sept. 1, 1959 |
| 2,911,630 | Dinowitz | Nov. 31, 1959 |